(12) United States Patent
Feola et al.

(10) Patent No.: US 6,207,733 B1
(45) Date of Patent: Mar. 27, 2001

(54) CAPPED AMINES AS HARDENERS FOR MONOCOMPONENT (1C) EPOXY RESIN SYSTEMS WHICH CAN BE DILUTED WITH WATER

(75) Inventors: Roland Feola; Friedrich Mueller; Johann Gmoser, all of Graz (AT)

(73) Assignee: Vianova Resins AG, Werndorf (AU)

( * ) Notice: Subject to any disclaimer, the term of this patent is extended or adjusted under 35 U.S.C. 154(b) by 0 days.

(21) Appl. No.: 09/307,974

(22) Filed: May 10, 1999

(30) Foreign Application Priority Data

May 12, 1998 (AT) ................................ A 802/98

(51) Int. Cl.$^7$ ............................... C08K 3/36; C08L 63/02
(52) U.S. Cl. ........................ 523/466; 528/123; 562/887
(58) Field of Search ............................ 528/123; 523/466; 562/887

(56) References Cited

U.S. PATENT DOCUMENTS

| | | |
|---|---|---|
| 3,442,856 | 5/1969 | Floyd . |
| 3,919,317 * | 11/1975 | Huff et al. ........................ 528/123 |
| 4,148,950 | 4/1979 | Brindell et al. . |
| 4,391,958 | 7/1983 | Minato et al. . |
| 4,748,083 | 5/1988 | Widmer et al. . |
| 4,758,615 * | 7/1988 | Engel et al. ........................ 524/198 |

FOREIGN PATENT DOCUMENTS

| | | |
|---|---|---|
| 2138748 * | 6/1995 | (CA) . |
| 33 25 061 A1 | 1/1985 | (DE) . |
| 34 441 110 A1 | 6/1986 | (DE) . |
| 0 240 083 A2 | 10/1987 | (EP) . |
| WO 92/18575 | 10/1992 | (WO) . |
| WO 98/02478 | 1/1998 | (WO) . |

OTHER PUBLICATIONS

Yang et al., Journal of Polymer Science, Part A, vol. 28, 1990, pp. 1861–1874.

* cited by examiner

Primary Examiner—Robert Dawson
Assistant Examiner—D. Aylward
(74) Attorney, Agent, or Firm—Frommer Lawrence & Haug LLP

(57) ABSTRACT

Capped amine hardeners for epoxy resins, which are reaction products of amines A having at least two primary amino groups, cyclic alkylene carbonates B, aliphatic carbonyl compounds C and compounds D having at least two groups which react with hydroxyl groups, such that in the first step, 0.1 to 1 mol of the primary amino groups for each 1 mol of the amine A are converted to hydroxyalkylurethane groups by reaction with the cyclic alkylene carbonate B, and the remaining primary amino groups are converted by reaction with the aliphatic carbonyl compound C in a second step to give ketimine or aldimine groups, and finally in the third step at least two of the molecules formed from A, B, and C are linked through reaction of the hydroxyl groups of the hydroxyalkylurethane groups with compound D. These capped amine hardeners are suitable for formulating water-dilutable monocomponent epoxy resin systems. The amines are released by addition of water, and are available for the curing reaction with the epoxy groups. Coatings formulated on the basis of this system are characterized by a very low content of auxiliary solvent. The cured coating films show outstanding leveling and film properties.

20 Claims, No Drawings

CAPPED AMINES AS HARDENERS FOR MONOCOMPONENT (1C) EPOXY RESIN SYSTEMS WHICH CAN BE DILUTED WITH WATER

RELATED APPLICATIONS

This application claims priority to Austrian Application No. A 802/98, filed May 12, 1998, herein incorporated by reference.

BACKGROUND OF THE INVENTION

1. Field of the Invention

Water-dilutable two-component epoxy resin systems which cure at room temperature have reached a technological level which comes close to conventional epoxy resin systems with respect to the desired properties such as adhesion to substrate, surface quality, and mechanical and chemical resistance.

Attempts were made, for convenience and processing safety, to develop monocomponent (1C) epoxy resin systems with latent catalysis, consisting of a combination of ketimines and epoxy resins. The advantages of these 1C systems are obvious: the hardener and epoxy resin are already present in the proper proportions, so that there is no danger of using an incorrect proportion. In conventional systems, curing occurs when the ketimines are hydrolyzed by moisture from the air. With water-dilutable systems, it is preferable to add a definite quantity of water, so that the curing time no longer depends on the humidity. Moreover, this leads to homogeneous curing through the entire film thickness, thereby improving the properties of the cured resin.

2. Description of the Related Art

Conventional 1C systems have been known for a long time, and are described in the following patents, for example: U.S. Pat. Nos. 3,442,856, 3,919,317, 4,148,950, 4,391,958, 4,748,083 and WO Application 92/18575.

Water-dilutable 1C systems with latent catalysis are described in WO-A 98/02478. A water-dilutable liquid epoxy resin is combined with ketone-blocked amines, known as ketimines. When water is added, the ketimine decomposes and the amine hardener is regenerated and is available for curing. As the system can be emulsified in water, this is an aqueous binder, the properties and processing of which are known to users of the two-component aqueous systems. This binder assures easier processing for the user, as the binder is already present at the correct ratio of hardener to epoxy resin. The curing reaction is started by addition of water, so that only a minimum quantity of water need be added to attain optimum properties for the coating.

Suitable amines which react with ketones to give ketimines include aliphatic linear, branched or cyclic amines with at least two primary amine groups, primary polyoxyalkylene diamines, partially or completely hydrogenated condensation products of aniline or its derivatives, as well as polyamidoamines with at least two terminal primary amino groups from aliphatic linear, branched or cyclic amines with at least two primary amino groups and dicarboxylic acids.

These amines have disadvantages, though. For instance, low molar mass diprimary amines combined with water-dilutable epoxy resins hardly give the desired properties such as good surface quality and a balanced ratio of film hardness to film flexibility after curing. Although polyoxyalkylene diamines are of high molar mass, their aliphatic and polar nature produces insufficiently water-resistant films. Condensation products of aniline derivatives, even if completely hydrogenated, are not very reactive at ambient temperature, which means that the curing time is long.

Non-hydrogenated, or only partially hydrogenated, products are also toxicologically objectionable. Amine hardeners for ketimine capping should contain solely primary amino groups, because only those can react easily with ketones, with elimination of water. Reaction of secondary amines with ketones to give enamines proceeds less smoothly. A residue of unblocked amines remains, seriously degrading the storage stability of the 1C systems. For that reason, epoxide-amine adducts and Mannich bases are not very suitable for ketimine capping.

Polyamidoamines meet the requirement that they contain only primary amino groups, and they also have the desired polymeric structure. One disadvantage of the less polar polyamidoamines is their poor compatibility with the water-dilutable epoxy resins. That is particularly the case if the dicarboxylic acids used have long chains (10 or more carbon atoms in the chain). Polyamidoamines based on short-chain dicarboxylic acids, on the other hand, are often crystalline and high-melting, and thus difficult to work with.

Poor compatibility of ketimines based on polyamidoamines with water-dilutable systems becomes apparent to the user primarily through surface problems and cloudiness in unpigmented paint films in the cured systems. The problem can, indeed, be reduced by adding suitable solvents; but that impairs the solvent balance of the system. Also, the advantages of an aqueous 1C system are partially lost.

OBJECT OF THE INVENTION

Now it has been found that an amine hardener suitable for ketimine capping, which combines in an ideal manner a high molar mass structure and good compatibility with water-dilutable epoxy resins, can be produced in a simple manner. That is done, in the first step, by reacting amine A, having at least two primary amino groups, in proper proportions with a cyclic alkylene carbonate B, preferably an $\alpha,\omega$-alkylene carbonate, to produce hydroxyalkyl urethanes AB. Then the remaining primary amino groups are reacted with aliphatic carbonyl compounds C to give ketimines ABC. In the subsequent step, at least two molecules of this precursor are mixed, through the preferably primary OH groups formed in the reaction with alkylene carbonate, with suitable multifunctional OH-reactive compounds D.

SUMMARY OF THE INVENTION

The present invention is therefore related to capped amine hardeners for epoxy resins, which are reaction products of amines A having at least two primary amino groups, cyclic alkylene carbonates B, aliphatic carbonyl compounds C and compounds D having at least two groups which react with hydroxyl groups. In the first step, for each 1 mol of amine A, 0.1 to 1 mol of the primary amino groups are converted, by reaction with the cyclic alkylene carbonate B, to hydroxyalkyl urethane groups. The remaining primary amino groups react in the second step with the aliphatic carbonyl compound C to give ketimine or aldimine groups. Then, in the third step, at least two of the molecules formed from A, B and C are linked with compound D through reaction of the hydroxyl groups of the hydroxyalkyl urethanes with compound D.

DESCRIPTION OF THE PREFERRED EMBODIMENTS

The amines A are selected from aliphatic linear, branched and cyclic, and mixed aliphatic-aromatic amines having at least two primary amino groups. Diamines are preferred, and diamines with no other secondary amino groups are particularly preferred. Examples of particularly suitable amines are: ethylene diamine, 2,2,4- and 2,4,4-trimethylhexamethylene diamine, neopentane diamine, 2-methyl-1,5-pentane diamine, 1,3-diaminopentane, hexamethylene diamine, and cycloaliphatic amines such as 1,2- or 1,3-diaminocyclohexane, 1,4-diamino-3,6-dimethylcyclohexane, 1,2-diamino-4-ethylcyclohexane, 1,4-diamino-3,6-diethyl-cyclohexane, 1-cyclohexyl-3,4-diaminocyclohexane, isophorone diamine, and their reaction products, bis-(4-aminocyclohexyl)-methane, bis-(4-aminocyclohexyl)-propane, 3,3'-dimethyl-4,4'-diaminodicyclohexylmethane, 1,3- and 1,4-bis-(aminomethyl)-cyclohexane, and aromatic amines with aliphatically bound amino groups such as 1,3- and 1,4-bis(aminomethyl)benzene. Of these, ethylene diamine, hexamethylene diamine, 1,2-diaminocyclohexane, isophorone diamine, bis-(4-aminocyclohexyl)-methane and 1,2-bis-(aminomethyl)benzene (m-xylylene diamine) are particularly preferred.

The cyclic alkylene carbonates, B, are esters of the carbonic acid with aliphatic diols, such as 2-keto-1,3-dioxolane, which may be substituted in the 4 and 5 positions by alkyl groups with, particularly, 1 to 4 carbon atoms; 2-keto-1,3-dioxane and 2-keto-1,3-dioxepane, which likewise may be substituted on at least one of the ring carbon atoms. Particularly suitable compounds are cyclic carbonates derived from diols such as ethylene glycol, 1,3-propylene glycol or 1,2-propylene glycol, and 1,4-butanediol, especially ethylene carbonate and 1,3-propylene carbonate. At least half of the amount of substance of these alkylene carbonates is preferably derived from an α,ω-dihydroxyalkane, so that a sufficient number of primary hydroxyl groups will be formed when alkylene carbonate B is added to amine A. The proportion of amino groups which one reacts with the alkylene carbonate B before making the ketimine may be arbitrarily selected and depends on the extent to which one may wish to extend the ketimine chain later.

It has proved advantageous to react 0.1 to 1.0 mol of the amino groups in 1 mol of amine A with alkylene carbonate B. It is preferred to react 0.2 to 0.95 mol, and especially preferably 0.3 to 0.9 mols, of alkylene carbonate B with 1 mol of the amine. That is done by pouring the alkylene carbonate into the amine with stirring. The reactivity depends on the nature of the amine. The reaction often starts immediately at the beginning of the addition at ambient temperature. Slight warming (to about 50° C.) is often necessary. The reaction is exothermic, so that cooling is required later. After completing the addition the mixture is held at 50 to 60 C. until the theoretical amine number is attained.

For the next reaction to produce the imino compound (ketimine or aldimine), a linear, branched or cyclic aliphatic carbonyl compound C, having 3 to 18 carbon atoms, preferably a ketone, is added to the mixture. Carbonyl compound C is preferably an aliphatic ketone with 3 to 12 carbon atoms. Examples of ketones which are reacted with the amines listed above to produce ketimines include: acetone, butanone, 2-pentanone, 3-pentanone, 4-methyl-2-pentanone, cyclopentanone, cyclohexanone, 2-methylcyclohexanone, methyl isopropyl ketone, ethyl isopropyl ketone, 2-hexanone, 3-hexanone, 2-heptanone, 3-heptanone, 4-heptanone, 2-octanone, 3-octanone, 4-octanone, diisopropyl ketone, diisobutyl ketone, 5-ethyl-2-nonanone, methyl isobutyl ketone and methyl isoamyl ketone. The method of synthesis of ketimines has been known and described for a long time. More recent procedures appear in the patents cited above and in U.S. Pat. No. 4,391,958, German Patent Application 33 25 061, German Patent Application 34 44 110, European Patent Application 0 240 083 and in the publication by Yang, C.-P., and Lee, L.-T., Journal of Polymer Science, Part A, Vol. 28, Page 1861.

Up to 100% stoichiometric excess of the carbonyl compound is used to convert as many as possible of the remaining free primary amino groups. After addition of a suitable azeotrope former and a catalyst, the mixture is heated to reflux, with elimination of water, until at least the theoretical amount of water has been removed. Ideally, up to 110% of the theoretical amount of water is distilled off to take into account the aldol condensation which proceeds as a side reaction. Then the azeotrope former and the excess carbonyl compound are distilled off under reduced pressure.

Suitable multifunctional OH-reactive compounds D are, particularly, epoxy compounds with at least two oxirane groups, and isocyanates with at least two isocyanate groups. Examples of suitable compounds are: the diglycidyl ethers of bisphenol A and bisphenol F, resorcinol, 1,4-butanediol, 1,6-hexanediol, polypropylene glycol, diglycidyl esters of tetrahydro- and hexahydro-phthalic acid, and the higher molar mass epoxy resins derived therefrom, with specific epoxide group contents of 100 to 20,000 mmol/kg, preferably 1000 to 10,000 mmol/kg; and glycidyl ethers of phenol and cresol novolacs.

Particularly preferred compounds are commercial aromatic epoxy resins based on bisphenol A or bisphenol F with specific epoxide group contents of 2,000 to 6,700 mmol/kg ("epoxide equivalent weight, EV"=molar mass divided by the number of epoxide groups per molecule, of 150 to 500 g/mol), diglycidyl ethers of alkanediols such as 1,4-butanediol or 1,6-hexanediol, and polypropylene glycols having specific epoxide group contents of 500 to 5000 mmol/kg ("epoxide equivalent weight" of 200 to 2000 g/mol). The epoxy resins can be used alone or in mixtures.

Isocyanates which can be used to advantage are, in particular, the difunctional and multifunctional isocyanates commonly used as cross-linking agents, such as hexamethylene diisocyanate, trimethylhexamethylene diisocyanate, isophorone diisocyanate, 4,4'-dicyclohexylmethane diisocyanate, toluylene diisocyanate, 4,4'-diphenylmethane diisocyanate, and the allophanates, biurets, and uretdiones derived therefrom. Difunctional aliphatic and aromatic isocyanates are particularly preferred.

The ketimines produced in this manner are ready for mixing with the water-dilutable epoxy resin.

When combined with water-dilutable epoxy resins, the hardeners thus produced yield films with good surface quality and good all-around properties. If addition of solvent is needed at all, it is for the purpose of adjusting the 1C system to a low viscosity.

In sum, the new systems allow working with smaller amounts of solvents than systems based on polyamidoamines. Of the water-dilutable epoxy resins, the ones which are particularly suitable with respect to the invention are the self-emulsifying epoxy resins produced by chemical incorporation of hydrophilic segments into the epoxy resin. Epoxy resins rendered hydrophilic by incorporation of polyoxyethylene segments are particularly preferred.

The water-dilutable monocomponent liquid epoxy resins systems according to the invention are used especially as unpigmented base coats or as coating agents for pigmented top coat in thin and thick layers for smooth and porous substrates, especially for mineral substrates, that is, on plaster, concrete, masonry, and flooring composition, and, in the water-diluted form, as impregnation for absorbent substrates; for instance, as modifiers for mineral filler coatings and flooring compositions (cement, anhydrite, magnesite flooring compositions). These liquid resin systems are also suitable for applying coatings to wood, metal (ferrous and non-ferrous metal) and plastic surfaces.

If desired, diluents, reactive diluents, and fillers can also be added to the formulation.

Particularly suitable diluents are those which contain ether and/or hydroxyl groups, so that they are compatible with aqueous systems. Examples are: aliphatic alcohols with 1 to 10 carbon atoms, such as ethanol, propanol, isopropanol, n-butanol, isobutanol, 2-butanol, methoxypropanol, ethoxypropanol, butoxypropanol, arylaliphatic alcohols such as phenoxyethanol, phenoxypropanol, 1-phenylethanol, 2-phenylethanol, 3-phenylpropanol and benzyl alcohol. Reactive diluents which may be considered include, for instance: butylglycidyl ether, phenylglycidyl ether, cresylglycidyl ether, monoglycidyl ethers of fatty alcohols with 8 to 18 carbon atoms, 2-ethylhexyl glycidyl ether, and glycidyl esters of 'Versatic®' acids, which are aliphatic monocarboxylic acids highly branched in the position adjacent to the carboxyl group, such as are sold by Shell Chemicals.

Suitable pigments and fillers include silicates such as talc, silica in various forms (quartz sand, quartz powder), titanium dioxide, zinc sulfide pigments, gypsum, baryte, iron oxide pigments such as iron oxide black and iron oxide yellow, and chromium oxide green. Other suitable fillers are glass (hollow) beads, plastic and rubber pellets, and effect appearance additives such as pearl gloss pigments and colored plastic chips. It is advantageous to use raw materials with minimum water content (residual moisture).

In the following examples, and in the preceding text, all values with the unit "%" are mass fractions if not otherwise specified. "Parts" are always parts by mass. Concentrations in "%" are mass fractions of the dissolved substance in the solution. The other physical quantities used in the examples and in the descriptive text are defined as follows:

Amine number is defined according to DIN 53 176 as the ratio of the mass of potassium hydroxide, $m_{KOH}$, which consumes exactly as much acid on neutralization as does the sample being examined, to the mass $m_B$ of that sample (mass of the solid in the sample in the case of solutions or dispersions). The commonly used unit is 'mg/g'.

The specific epoxide group content, SEC, is the ratio of the amount of substance of the epoxide groups, n(EP) to the mass m of the epoxide (always the mass of the dissolved or dispersed epoxy resin in the case of solutions or dispersions):

$$SEC = \frac{n(EP)}{m}$$

The unit commonly used is 'mmol/kg'.

The "epoxide equivalent weight" (abbreviated "EEW" or "epoxide equivalent", abbreviated "EV value") is the inverse of the SEG, and is defined as the ratio of the (number average) molar mass of the epoxide to the mean number of epoxide groups per molecule.

The specific amine hydrogen content, SHC, is the ratio of the amount of substance of amine hydrogen atoms, n(H) to the mass m of the material (the mass of the dissolved or dispersed material, for solutions or dispersions):

$$SHC = \frac{n(H)}{m}$$

The commonly used unit is 'mmol/kg'. The "amine hydrogen equivalent weight" or "(amine)active-H equivalent weight" (abbreviated "HAV value"), or even the "amine hydrogen equivalent" (abbreviated "HAV") is the inverse of the SHC and is defined as the ratio of the (number average) molar mass of the amine in question to the mean number of amine hydrogen atoms per molecule.

EXAMPLES

The following examples are intended to explain the invention, and not to limit its scope.
Water-dilutable liquid epoxy resins
With added emulsifier, E1
  A mixture of
    910 g Beckopox® EP 116 (epoxide resin of Vianova Resins GmbH, with a specific epoxide group content of 5560 mmol/kg (epoxide equivalent weight EV of 180 g/mol), based on bisphenol A/F)
    39 g Simulsol M53 (stearic acid ethoxylated with 50 mol of ethylene oxide, made by Seppic, France)
    20 g Simulsol 1030 NP (Nonylphenol ethoxylated with 10 mol ethylene oxide, made by Seppic, France) and
    25 g Octarox® □4030 (Octylphenol ethoxylated with 40 mol of ethylene oxide, made by Seppic, France) was homogenized at 70° C.

| | |
|---|---|
| Specific epoxide group content: | 5076 mmol/kg |
| (Epoxide equivalent: | 197 g/mol) |
| Viscosity: | 800 mPa · s at 25° C. |

Self-emulsifiable, E2
  389 g of a diglycidyl ether of Bisphenol A having a specific epoxide group content of 5405 mmol/kg (an EV of 185 g/mol); Beckopox® EP 140, of Vianova Resins GmbH) was heated to 125° C. in a nitrogen atmosphere with
  311 g polyethylene glycol having a mean molar mass of 2000 g/mol.
  1.5 g of a BF$_3$-amine complex (Anchor® 1040 of the Anchor company) was added with good stirring. Then the temperature was raised continuously to 150° C. over a period of four hours. The specific epoxide group content was now 2380 to 2410 mmol/kg (EV 415–420 g/mol). The mixture solidified at room temperature to become a waxy-crystalline mass.
  175 g of the diglycidyl ether of Bisphenol F having a specific epoxide group content of 5710 to 6061 mmol/kg (EV 165–175 g/mol, Epikote®862, Shell Chemicals) and
  325 g diglycidyl ether of Bisphenol A (Beckopox® EP 140, Vianova Resins GmbH) were homogenized at room temperature.
  68.2 g of the emulsifier specified above was added to the homogeneous mixture (12%, based on the total mass) and then the mixture was homogenized for two hours under nitrogen at 70° C.

| | |
|---|---|
| Specific epoxide group content: | 5128 mmol/kg |
| (Epoxide equivalent weight: | 195 g/mol) |
| Viscosity: | 4800 mPa · s at 25° C. |

Ketimine

Example H1 (Reaction of the ketimine precursor with epoxy resin)

116 g (1.0 mol) hexamethylene diamine and
150 g toluene were heated to 40° C. with stirring.
88 g (1.0 mol) ethylene carbonate were added over a period of 1 hour. The exothermic reaction started immediately. The temperature was limited to a maximum of 50° C. by cooling. Then stirring was continued at 50° C. until an amine number of 158 mg/g was attained.
Then
144 g (2.0 mol) methyl ethyl ketone and
0.5 g p-toluenesulfonic acid, the catalyst for ketimine formation, were added, and the mixture was heated to reflux, as elimination of water began. After separation of 110% of the theoretical amount of water (ca. 20 g), the solvent mixture was distilled off, first at standard pressure and then at 50 mbar. Then 114 g (0.5 mol) of a diepoxide resin based on polypropylene glycol (specific epoxide group content ca. 3125 mmol/kg, EV ca. 320 g/mol) were added at 90° C. over 30 minutes. The mixture was heated to 120° C., utilizing the slight exothermy of the reaction, and was held at that temperature until a specific epoxide group content below 50 mmol/kg was attained (epoxide equivalent weight >20,000 g/mol).

Example H2 (Reaction of the ketimine precursor with isocyanate)

The procedure was the same as in Example HI up to the distillation of the solvent mixture at 50 mbar. Over a period of 30 minutes, 105 g (0.5 mol) trimethylhexamethylene diisocyanate were added at 90° C. The temperature rose to 120° C. because of the exothermic reaction. The mixture was held at that temperature until a NCO content of practically 0% was attained.

Examples H3 to H11

Other binders were produced in the same manner as in Examples H1 or H2, according to the data in Table 1.
The following abbreviations are used in the table:
EP 1: Diepoxide resin based on Bisphenol A (SEC ca. 2100 mmol/kg; EEW ca. 475 g/mol)
EP 2: Diepoxide resin based on Bisphenol A (SEC ca. 5260 mmol/kg; EEW ca. 190 g/mol)
EP 3: Diepoxide resin based on polypropylene glycol (SEC ca. 3100 mmol/kg; EEW ca. 320 g/mol)
EP 4: Diepoxide resin based on 1,6-hexanediol (SEC ca. 8700 mmol/kg; EEW ca 115 g/mol.
MEK: Methyl ethyl ketone
DEK: diethyl ketone
DIK: diisopropyl ketone
MXDA: meta-xylylene diamine
ED: ethylene diamine
DCH: 1,2-diaminocyclohexane
HMDA: 1,6-hexamethylene diamine
IPDA: isophorone diamine
DADCH: 4,4'-diaminodicyclohexylmethane
THMDI: trimethylhexamethylene diisocyanate
TDI: toluylene diisocyanate
HMDI: 1,6-hexamethylene diisocyanate

TABLE 1

| | Amine | | | Ethylene carbonate | | Ketone | | |
|---|---|---|---|---|---|---|---|---|
| Example | mass g | amount of substance mol | Type | mass g | amount of substance mol | mass g | amount of substance mol | Type |
| H1 | 116 | 1 | HMDA | 88 | 1 | 144 | 2 | MEK |
| H2 | 116 | 1 | HMDA | 88 | 1 | 144 | 2 | MEK |
| H3 | 60 | 1 | ED | 88 | 1 | 129 | 1.5 | DEK |
| H4 | 68 | 0.5 | MXDA | 62 | 0.7 | 251 | 2.2 | DIK |
| | 85 | 0.5 | IPDA | | | | | |
| H5 | 68 | 0.5 | MXDA | 44 | 0.5 | 158 | 2.2 | MEK |
| | 105 | 0.5 | DADCH | | | | | |
| H6 | 68 | 0.5 | MXDA | 70 | 0.8 | 189 | 2.2 | DEK |
| | 57 | 0.5 | DCH | | | | | |
| H7 | 136 | 1 | MXDA | 53 | 0.6 | 180 | 2.5 | MEK |
| H8 | 95 | 0.7 | MXDA | 70 | 0.8 | 206 | 2.4 | DEK |
| | 63 | 0.3 | DADCH | | | | | |
| H9 | 57 | 0.5 | DCH | 88 | 1 | 144 | 2 | MEK |
| | 30 | 0.5 | ED | | | | | |
| H10 | 95 | 0.7 | MXDA | 18 | 0.2 | 399 | 3.5 | DIK |
| | 34 | 0.3 | DCH | | | | | |
| H11 | 168 | 0.8 | DADCH | 53 | 0.6 | 194 | 2.7 | MEK |
| | 23 | 0.2 | HMDA | | | | | |

| | Epoxy resin | | | Isocyanate | | | | | | |
|---|---|---|---|---|---|---|---|---|---|---|
| Example | mass g | amount of substance mol | Type | mass g | amount of substance mol | Type | Solid resin[1] mass g | Amine number mg/g | HAV[2] g/mol | SHC[3] mmol/kg |
| H1 | 320 | 0.5 | EP 3 | — | — | — | 596 | 94 | 298 | 3356 |

TABLE 1-continued

| | | | | | | | | | | |
|---|---|---|---|---|---|---|---|---|---|---|
| H2 | — | — | — | 105 | 0.5 | THMDI | 381 | 147 | 190 | 5263 |
| H3 | 64 | 0.1 | EP 3 | — | — | — | 678 | 82 | 339 | 2950 |
| | 380 | 0.4 | EP 1 | | | | | | | |
| H4 | 332 | 0.35 | EP 1 | — | — | — | 695 | 105 | 267 | 3745 |
| H5 | 237 | 0.25 | EP 1 | — | — | — | 562 | 149 | 187 | 5348 |
| H6 | — | — | — | 67 | 0.4 | HMDI | 365 | 184 | 152 | 6579 |
| H7 | — | — | — | 52 | 0.3 | TDI | 342 | 229 | 122 | 8197 |
| H8 | 76 | 0.2 | EP 2 | 34 | 0.2 | HMDI | 441 | 152 | 184 | 5435 |
| H9 | 192 | 0.3 | EP 3 | — | — | — | 515 | 109 | 257 | 3891 |
| | 76 | 0.2 | EP 2 | | | | | | | |
| H10 | 95 | 0.1 | EP 1 | — | — | — | 447 | 225 | 124 | 8065 |
| H11 | 69 | 0.3 | EP 4 | — | — | — | 414 | 189 | 148 | 6757 |

[1]less excess ketone
[2]SHC: specific content of amine hydrogen atoms; see definition in text
[3]HAV: "amine hydrogen equivalent", inverse of SHC; see definition in text.

The ketimine hardeners described previously and listed in Table 1 were mixed with the water-dilutable epoxy resins in that manner.

The anhydrous but water-dilutable resins were mixed in molar ratios of 0.8 to 1.2 mol of epoxide groups to 1.0 mol of amine hydrogen in the amine to be released. Immediately before application, enough water (to decompose the ketimine) was added to release the amine hardener. Depending on the reactivity and the ambient temperature, the pot life was up to 24 hours, but at least 2 hours.

The typical pot life of these systems is 4 to 12 hours. In addition, more water can be added, preferably in a mass ratio of water to resin-hardener mixture of 1:20 to 20:1, preferably 1:10 to 10:1, and especially preferably 1:5 to 5:1. It is also possible, though, especially for thin layers on moist substrates, to apply the mixture to the substrate without adding water. That procedure is not desirable for a dry substrate and low humidity.

Applications technology testing

Systems such as are shown in Table 2 were formulated for applications technology comparison. The mixing ratio of epoxy resin/hardener was always stoichiometric (1 mol of epoxide group per 1 mol of amine hydrogen). The systems were "started" by adding water shortly before application. A ketimine hardener based on Laromin® C 260, BASF AG, capped by reaction with 3-pentanone (designated as V in Table 2) was used for comparison. The cured coating was distinguished by a good surface flow. Methoxypropanol (MP) was used as a water-compatible solvent to adjust the coating viscosity or the film flow with the comparison hardner. The solvent requirement for the new formulations was destinctly reduced.

The test results are summarized in Table 2. Addition of water was not absolutely necessary for thin coatings, but it accelerated the reaction.

Systems which cure faster can be formulated by adding suitable catalysts. Suitable catalysts are, for example, tertiary amines such as benzyldimethylamine, or acids such as salicylic acid or p-toluenesulfonic acid. The catalyst is best added immediately on formulation of the coating, e.g., at the same time as the water; otherwise the storage stability of the 1C system would be reduced.

TABLE 2

| | Hardener | | Epoxy resin | | Water | MP | Coating composition |
|---|---|---|---|---|---|---|---|
| Example | mass g | Type | mass g | Type | mass g | mass g | mass g |
| 1 | 76 | H1 | 50 | E1 | 14 | 10 | 150 |
| 2 | 76 | H1 | 50 | E2 | 14 | 8 | 148 |
| 3 | 48 | H2 | 50 | E1 | 10 | 7 | 115 |
| 4 | 49 | H2 | 50 | E2 | 10 | 7 | 116 |
| 5 | 86 | H3 | 50 | E1 | 15 | 15 | 166 |
| 6 | 68 | H4 | 50 | E1 | 13 | 10 | 141 |
| 7 | 47 | H5 | 50 | E1 | 10 | 5 | 112 |
| 8 | 38 | H6 | 50 | E1 | 9 | 5 | 102 |
| 9 | 31 | H7 | 50 | E1 | 9 | 5 | 95 |
| 10 | 47 | R8 | 50 | E1 | 10 | 7 | 114 |
| 11 | 65 | H9 | 50 | E1 | 12 | 8 | 135 |
| 12 | 31 | H10 | 50 | E1 | 8 | 0 | 89 |
| 13 | 37 | H11 | 50 | E1 | 9 | 0 | 96 |
| Comparison | 24 | V | 50 | E1 | 9 | 18 | 101 |

| Example | Mass fraction of MP in the coating composition % | Potlife (working time) h | Drying time (dust-free) h | Drying time (non-tacky) h | Flow | Film Cloudiness | Wasser resistance after 24 hours |
|---|---|---|---|---|---|---|---|

TABLE 2-continued

| | | | | | | | |
|---|---|---|---|---|---|---|---|
| 1 | 6.7 | 6 | >12 | >12; <24 | 1–2 | 1 | 1 |
| 2 | 5.4 | 6 | >12 | >12; <24 | 1 | 0 | 0 |
| 3 | 6 | 6 | >12 | >12; <24 | 1 | 1 | 1 |
| 4 | 6 | 6 | >12 | >12; <24 | 1 | 0 | 1 |
| 5 | 9 | 5 | 8 | 12 | 1 | 0 | 0 |
| 6 | 7.1 | 6 | 6 | 10 | 0 | 0 | 0 |
| 7 | 4.5 | 7 | 6.5 | 10 | 1 | 0 | 0 |
| 8 | 4.9 | 7 | 8 | 12 | 1 | 0 | 1 |
| 9 | 5.3 | 4 | 5.5 | 9 | 1 | 0 | 0 |
| 10 | 6.1 | 5 | 7 | 10 | 0 | 0 | 0 |
| 11 | 5.9 | 6 | 8 | 12 | 1 | 0 | 1 |
| 12 | 0 | 5 | 6 | 9 | 1–2 | 1 | 1 |
| 13 | 0 | >8 | 12 | >12; <24 | 1 | 0 | 1 |
| Comparison | 17.8 | 6 | 12 | >12; <24 | 3 | 3 | 1 |

Formulations such as those in Table 2 were used as examples for a non-pigmented coat.

The formulations listed above can be produced in various ways. For instance, all the components of the formulation except for the ketimine can be mixed in an ordinary production tank. Pigmented versions can be produced in the same way as the unpigmented ones. The pigments and fillers are milled in the pure epoxy resin without the ketimine. Alternatively, a pigment paste can be used. Products produced in that manner should be packaged with air moisture excluded. Flushing with dry nitrogen or dry air is desirable before the package is closed. The products listed can be applied by pouring, immersion, or flooding, or by use of the usual aids such as a brush, roller, doctor blade, trowel, compressed air sprayer, or airless sprayer. As a rule, the formulations which contain pigment or filler should be stirred before use. Water addition should be done with a slowly running stirrer, and the material should be mixed well for at least three minutes. Particularly suitable substrates are wood, all mineral bases, the known plastics, especially plastics based on poly-addition polymers, and metals such as aluminum, alloys of aluminum and other light metal alloys, iron, galvanized iron, stainless steel and brass. One can wait for the coatings to cure at room temperature, or accelerate curing by heating up to 150° C. Another possibility for accelerated curing is passing through steam-heated drying systems.

Test methods used

Viscosity is measured in the usual manner in a commercial plate-cone viscometer.

The end of the working time (pot life) is reached when the resin dispersion in the supply tank has set (cross-linked).

Leveling:

Following application to a glass plate (dry film thickness 40 μm), visual evaluation of surface after a drying time of 24 hours at ambient temperature. Ratings 0 to 5:
0 Smooth, glossy
1 Slightly wavy, glossy
2 Moderately wavy, glossy
3 Moderately wavy, dull
4 Heavily structured, dull
5 Heavily structured, rough, inhomogeneous Film cloudiness:

Following application to a glass plate (as above), visual evaluation of the surface after a drying time of 24 hours at ambient temperature. Ratings 0 to 5:
0 Clear
1 Slightly opaque
2 Slight milky cloudiness
3 Moderate milky cloudiness
4 Severe milky cloudiness
5 Very severe cloudiness, inhomogeneous Water resistance:

Following application to a glass plate (as above) and seven days drying at ambient temperature, a water-soaked cotton pad is laid on the coating. It is covered with an inverted glass bowl to keep it from drying too soon. After 24 hours, the pad, still wet, is removed, and the change in the surface is evaluated visually. Ratings 0 to 5:
0 No change
1 Slight wrinkling, no clouding
2 Moderate wrinkling, slight clouding
3 Severe wrinkling, moderate clouding
4 Cracks, bubbles, severe clouding
5 Film destroyed; cracks, peeling The above description is intended to be illustrative and not limiting. Various changes or modifications in the embodiments described may occur to those skilled in the art. These can be made without departing from the scope or spirit of the invention.

What is claimed is:

1. A capped amine hardener for epoxy resins obtained by a process which comprises:

a. reacting amines, A, where said amines have at least two primary groups and no other secondary amino groups with cyclic aliphatic carbonates, B, which are esters of carbonic acid with aliphatic diols, under conditions sufficient so that for each 1 mol of A, 0.01 to 1 mol of the primary amine groups are converted into hydroxyalkylurethane groups;

b. reacting the products obtained above with aliphatic carbonyl compounds, C, under conditions sufficient so that the remaining primary amino groups in said products are converted to ketimine or aldimine groups; and c. linking at least two of the products formed in step b) by reacting said products with compounds D, which have at least two groups which react with hydroxyl groups, under conditions sufficient to react with the hydroxyalkylurethane groups.

2. A capped amine hardener according to claim 1, wherein di-primary amines are used as amine A.

3. A capped amine hardener according to claim 2, wherein the amine A is selected from the group consisting of ethylene diamine, 2,2,4- and 2,4,4-trimethylhexamethylene diamine, neopentane diamine, 2-methyl-1,5-pentane diamine, 1,3-diaminopentane, hexamethylene diamine, 1,2- or 1,3-diaminocyclohexane, 1,4-diamino-3,6-dimethylcyclohexane, 1,2-diamino-4-ethylcyclohexane, 1,4-diamino-3,6-diethylcyclohexane, 1-cyclohexyl-3,4-diaminocyclohexane, isophorone diamine, bis-(4-aminocyclohexyl)-methane, bis-(4-aminocyclohexyl)-propane, 3,3'-dimethyl-4,4'-diaminodicyclohexylmethane, 1,3- and 1,4-bis-(aminomethyl)-cyclohexane, 1,3- and 1,4-bis(aminomethyl)benzene.

4. A capped amine hardener according to claim 2, wherein the amine A is selected from the group consisting of ethylene diamine, hexamethylene diamine, 1,2-diaminocyclohexane, isophorone diamine, bis-(4-aminocyclohexyl)-methane and 1,3-bis(aminomethyl)benzene.

5. A capped amine hardener according to claim 1, wherein compound B is selected from the group consisting of cyclic carbonates derived from ethylene glycol, 1,2-propylene glycol and 1,4-butanediol.

6. A capped amine hardener according to claim 1, wherein the carbonyl compound C is a linear, branched or cyclic aliphatic carbonyl compound having 3 to 18 carbon atoms.

7. A capped amine hardener according to claim 6, wherein carbonyl compound C is selected from the group consisting of acetone, butanone, 2-pentanone, 3-pentanone, 4-methyl-2-pentanone, cyclopentanone, cyclohexanone, 2-methylcyclohexanone, methyl isopropyl ketone, ethyl isopropyl ketone, 2-hexanone, 3-hexanone, 2-heptanone, 3-heptanone, 4-heptanone, 2-octanone, 3-octanone, 4-octanone, diisopropyl ketone, diisobutyl ketone, 5-ethyl-2-nonanone, methyl isobutyl ketone and methyl isoamyl ketone.

8. A capped amine hardener according to claim 6, wherein the carbonyl compound C is selected from the group consisting of methyl ethyl ketone, diethyl ketone and diisopropyl ketone.

9. A capped amine hardener according to claim 1, wherein compound D is an epoxy compound with at least two oxirane groups or an isocyanate compound with at least two isocynate groups.

10. A capped amine hardener according to claim 9, wherein compound D is selected from the group consisting of the diglycidyl ethers of bisphenol A and bisphenol F, resorcinol, 1,4-butanediol, 1,6-hexanediol, polypropylene glycol, diglycidyl esters of tetrahydro- and hexahydrophthalic acid, and the higher molar mass epoxy resins derived therefrom, with specific epoxide group contents of 100 to 20,000 mmol/kg, glycidyl ethers of phenol and cresol novolacs.

11. A capped amine hardener according to claim 9, wherein compound D is selected from the group consisting of diepoxides based on bisphenol A, polypropylene glycol and 1,6-hexanediol, each with a specific epoxide group content of 1,000 to 10,000 mmol/kg.

12. A capped amine hardener according to claim 9, wherein compound D is a difunctional aliphatic or aromatic isocyanate.

13. A capped amine hardener according to claim wherein compound D is selected from the group consisting of 1,6-diisocyanatohexane (hexamethylene diisocyanate), isophorone diisocyanate, diphenylmethane diisocyanate, meta-xylylene diisocyanate and toluylene diisocyanate.

14. A process for preparing a capped amine hardener which comprises a. reacting amines, A, where said amines have at least two primary groups, with aliphatic carbonates, B, under conditions sufficient so that for each 1 mol of A, 0.01 to 1 mol of the primary amino groups are converted into hydroxyalkylurethane groups;

b. reacting the product obtained above with aliphatic carbonyl compounds, C, under conditions sufficient so that the remaining primary amino, groups in said products are converted to ketimine or aldimine groups; and c. linking at least two of the products formed in step b by reacting said products with compound D hydroxyl groups, under conditions sufficient to link the hydroxylalkylurethane groups.

15. The process according to claim 14, wherein the aliphatic carbonate B is 2-keto-1,3-dioxolane which produces a β-hydroxyurethane and at least two of the corresponding aldimine or ketomine products ABC obtained in step b are linked through reaction of the hydroxyl groups of the β-hydroxyurethane groups with compound D in step c.

16. A water-dilutable monocomponent epoxy resin composition comprising a water-dilutable epoxy resin and capped amine hardener according to claim 1 and, optionally, a diluent, reactive diluent or filler.

17. A water-dilutable monocomponent epoxy resin compositions according to claim 16, wherein the epoxy resin is self-emulsifying in water due to incorporation of segments with repeating oxyethylene units.

18. In a method for coating a smooth or porous substrate, the improvement which comprises applying a water-dilutable monocomponent epoxy resin composition according to claim 1 to said substrate.

19. A substrate which is, obtained applying a water-dilutable monocomponent epoxy resin composition to the surface of said substrate.

20. A capped amine hardener according to claim 1, wherein compound B is selected from the group consisting of 2-keto-1,3-dioxolane, which is optionally substituted in the 4 and 5 positions by alkyl groups, 2-keto-1,3-dioxane, 2-keto-1,3-dioxepane, 2-keto-1,3-dioxane which is substituted on at least one of the ring carbon atoms, 2-keto-1,3-dioxepane which is substituted on at least one of the ring carbon atoms, ethylene carbonate and 1,3-propylene carbonate.

* * * * *